US008459908B2

(12) United States Patent
Cook

(10) Patent No.: US 8,459,908 B2
(45) Date of Patent: Jun. 11, 2013

(54) TOOL HOLDER DAMPING SYSTEM

(76) Inventor: Harold D. Cook, Dana Point, CA (US)

(*) Notice: Subject to any disclaimer, the term of this patent is extended or adjusted under 35 U.S.C. 154(b) by 0 days.

(21) Appl. No.: 13/212,944

(22) Filed: Aug. 18, 2011

(65) Prior Publication Data
US 2011/0299951 A1 Dec. 8, 2011

Related U.S. Application Data

(62) Division of application No. 11/787,875, filed on Apr. 18, 2007, now Pat. No. 8,043,036.

(51) Int. Cl.
B23C 5/26 (2006.01)

(52) U.S. Cl.
USPC .............................. 409/234; 409/131; 76/115

(58) Field of Classification Search
USPC ............ 409/131–132, 231–234, 141; 76/115; 408/143, 238–239 R
See application file for complete search history.

(56) References Cited

U.S. PATENT DOCUMENTS

| | | | |
|---|---|---|---|
| 3,554,080 A | 1/1971 | Herrmann | |
| 3,678,632 A | 7/1972 | Eversole et al. | |
| 4,122,755 A * | 10/1978 | Johnson et al. | 409/233 |
| 4,714,389 A | 12/1987 | Johne | |
| 4,818,161 A | 4/1989 | Cook | |
| 4,840,520 A | 6/1989 | Pfalzgraf | |
| 4,971,491 A | 11/1990 | Cook | |
| 5,311,654 A | 5/1994 | Cook | |
| 5,582,494 A | 12/1996 | Cook | |
| 5,595,391 A | 1/1997 | Rivin | |
| 5,975,816 A | 11/1999 | Cook | |
| 5,979,912 A | 11/1999 | Cook | |
| 6,035,512 A | 3/2000 | Cook | |
| 6,071,219 A | 6/2000 | Cook | |
| 6,109,842 A | 8/2000 | Cook | |
| 6,161,309 A | 12/2000 | Cook | |
| 6,224,306 B1 | 5/2001 | Hiroumi | |
| 6,345,942 B1 | 2/2002 | Cook | |
| 6,382,888 B2 | 5/2002 | Cook | |
| 6,409,439 B1 * | 6/2002 | Riviere | 409/131 |
| 6,425,716 B1 | 7/2002 | Cook | |
| 6,537,000 B1 | 3/2003 | Weck | |
| 6,779,955 B2 | 8/2004 | Rivin | |
| 7,284,938 B1 * | 10/2007 | Miyazawa | 409/231 |
| 2003/0180111 A1 * | 9/2003 | Sugata et al. | 409/136 |
| 2005/0214087 A1 | 9/2005 | Agapiou | |
| 2006/0140736 A1 * | 6/2006 | Kress et al. | 409/234 |

FOREIGN PATENT DOCUMENTS

| | | | |
|---|---|---|---|
| JP | 62044350 A | | 2/1987 |
| JP | 05337769 A | | 12/1993 |
| JP | 07185983 A | * | 7/1995 |
| JP | 08155774 A | | 6/1996 |
| JP | 2002192433 A | * | 7/2002 |
| JP | 2003334738 A | * | 11/2003 |

* cited by examiner

Primary Examiner — Daniel Howell
(74) Attorney, Agent, or Firm — Christie, Parker & Hale, LLP

(57) ABSTRACT

A tool holder for use in a rotating spindle of a milling machine. The tool holder comprises a conically tapered shank portion for insertion into the spindle and a cutting tool mounting portion. Disposed between the shank and mounting portions is a flange portion. The flange portion includes a continuous channel formed therein which circumvents the shank portion and is adapted to accommodate a dampening member. The dampening member is compressible between the flange portion and the spindle when the tool holder is inserted into the spindle, and is adapted to eliminate harmonic resonance attributable to the use of the tool holder with a cutting tool.

14 Claims, 4 Drawing Sheets

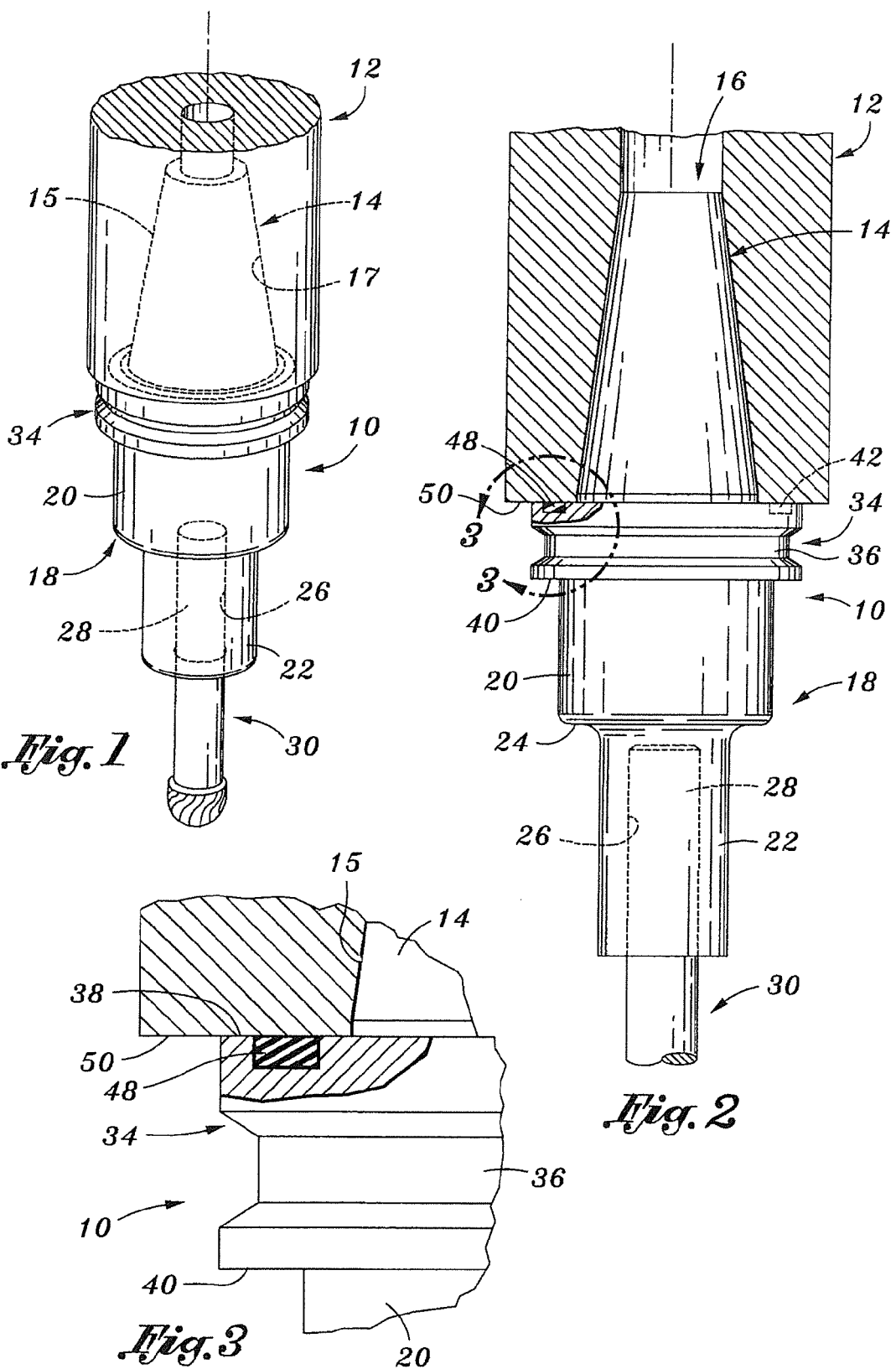

TOOL HOLDER DAMPING SYSTEM

CROSS-REFERENCE TO RELATED APPLICATION(S)

This application is a divisional of U.S. patent application Ser. No. 11/787,875 filed Apr. 18, 2007, now U.S. Pat. No. 8,043,036 the entire contents of which are incorporated herein by reference.

FIELD

The present invention relates generally to rotary cutting machines such as milling machines, and more particularly to a vibration-dampened spindle and tool holder assembly which is adapted to eliminate the harmonic resonance which typically occurs during the use of cutting tools in high speed milling applications.

BACKGROUND

As is well known, various tool holders have been utilized in the prior art which interface with a rotating spindle of a machine such as a milling or boring machine to securely interface a cutting tool to the machine during the cutting of a work piece. A rotary cutting machine typically includes a motor-rotated spindle to which a tool holder is attached, the tool holder being configured to accommodate a shank portion of a cutting tool which is ultimately used to cut a work piece. The attachment of the tool holder to the spindle is generally accomplished by providing a cavity in the spindle into which an upper end or shank portion of the tool holder is secured, as with an externally threaded bolt which is advanced through a portion of the spindle and is threadably received into an internally threaded bore extending axially within the shank portion of the tool holder. In most prior art tool holders, a central aperture is also formed in a lower end or mounting portion of the tool holder for receiving the shank portion of the cutting tool which is to be interfaced to the milling or other machine via the tool holder. Subsequent to the insertion of the shank portion of the cutting tool into the central aperture of the tool holder, the shank portion of the tool holder is drawn or pulled tightly into the spindle by the tightening of the above-described bolt so as to rigidly maintain the cutting tool within the tool holder.

Though interfacing the cutting tool to the cutting machine, prior art tool holders typically possess certain deficiencies which detract from their overall utility. More particularly, while slower rotational speeds generally permit the cutting machine to perform adequately, high speed cutting, which is preferred, can cause substantial difficulty in producing a satisfactory work as a result of the development of vibratory forces that occur between the spindle and the tool holder. Specifically, at higher rotational cutting speeds, the cutting tool often begins to chatter or vibrate such that adequate tool control cannot be maintained and damage to the work piece, along with potential injury to the operator, can realistically occur. More particularly, the transfer of the harmonic resonance into the tool holder may give rise to slight movements thereof relative to the spindle, and in extreme cases may result in the tool holder loosening within the spindle. As will be recognized, the resonance of the tool holder relative to the spindle results in the cut in the work piece being substantially out of tolerance.

A further deficiency with prior art tool holders is that the manner in which the shank portion of the cutting tool is secured within the central aperture of the tool holder often results in the non-concentric mounting of the cutting tool within the tool holder. Such non-concentric mounting is unacceptable in modem, high tolerance machining applications such as those performed on a vertical milling machine wherein minor variations in the concentricity of the cutting tool within the tool holder often cause catastrophic failure in the cutting operation.

The present invention addresses these and other deficiencies of the prior art tool holders by providing a tool holder which includes a dampening member for eliminating the harmonic resonance which typically occurs during the use of cutting tools in high speed milling applications. In the tool holder constructed in accordance with the present invention, the non-concentric mounting of the shank portion of the cutting tool within the tool holder is also substantially eliminated by the heat shrinking of the shank portion of the cutting tool within the tool holder. These, as well as other features and advantages attendant to the present invention will be discussed in more detail below.

SUMMARY

In accordance with the present invention, there is provided a tool holder for use in the rotating spindle of a milling machine. The tool holder comprises a conically tapered shank portion which is adapted to be inserted into a complimentary recess within the spindle. In addition to the shank portion, the tool holder includes a cutting tool mounting portion which includes an aperture extending axially therein for receiving the shank portion of a cutting tool. Formed between the shank and mounting portions is a circularly configured flange portion which extends radially outward relative to the shank and mounting portions. Disposed within the peripheral edge of the flange portion is a generally V-shaped slot or recess which is adapted to accommodate an automated tool holder changer.

The tool holder of the present invention further comprises an annular, ring-like dampening member which is disposed within a complimentary groove or channel disposed within the generally planar top surface of the flange portion and extending about (i.e., circumventing) the shank portion thereof. The dampening member is preferably fabricated from an elastomeric material, and is compressed between the flange portion and the generally planar distal end of the spindle when the shank portion of the tool holder is inserted into and secured within the spindle. The complete insertion of the tool holder into the spindle is preferably facilitated in a manner wherein direct, metal-to-metal contact is achieved between the distal end of the spindle and the top surface of the flange portion. However, such metal-to-metal contact, though preferable, need not necessarily be achieved. If such metal-to-metal contact is achieved, the abutting engagement between the distal end of the spindle and the top surface of the flange portion effectively encloses the channel within the top surface, with the dampening member being sized such that, when compressed, it substantially fills the available open area defined by the enclosed channel and imparts a resilient biasing force against both the tool holder and the spindle seated thereagainst. When the dampening member is compressed in this manner, it is adapted to eliminate harmonic resonance which would normally otherwise occur when the shank portion of a cutting tool is inserted into the aperture of the cutting tool mounting portion of the tool holder and the cutting tool is used in a high speed milling application. The dampening member also creates a seal between the flange portion of the tool holder and the spindle which prevents debris, cutting oil, or other contaminants from getting between the shank portion of the tool holder and the recess of the spindle, thus maintaining the cleanliness of the spindle/tool holder combination. Due to the dampening member being received into the complimentary channel formed in the top surface of the flange portion of the tool holder, the same is prevented from excessive radial displacement when the tool holder is used in extremely high speed milling applications.

The present invention will be more apparent from the following detailed description taken in conjunction with the accompanying drawings.

BRIEF DESCRIPTION OF THE DRAWINGS

These, as well as other features of the present invention, will become more apparent upon reference to the following drawings.

FIG. 1 is a perspective view of a tool holder constructed in accordance with a first embodiment of the present invention as inserted into the rotating spindle of a milling machine.

FIG. 2 is a partial cross-sectional view of the tool holder and spindle combination as shown in FIG. 1.

FIG. 3 is an enlarged view of the encircled region 3 shown in FIG. 2, illustrating the dampening member of the tool holder in a compressed state between the tool holder and the spindle of the milling machine.

Common reference numerals are used throughout the drawings and the detailed description to indicate the same elements.

DETAILED DESCRIPTION

Figure 4:
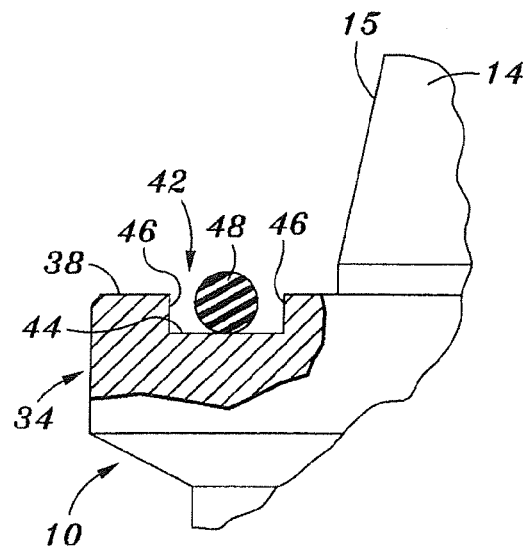
FIG. 4 is a partial cross-sectional view of the tool holder of the first embodiment similar to FIG. 3, but illustrating the dampening member of the tool holder in an uncompressed state resulting from the removal of the tool holder from within the spindle.

Referring now to the drawings wherein the showings are for purposes of illustrating preferred embodiments of the present invention only, and not for purposes of limiting the same, FIG. 1 perspectively illustrates a tool holder 10 which is constructed in accordance with the present invention and adapted for use in the rotating spindle 12 of a machine such as a milling machine or a boring machine. The tool holder 10 comprises a conically tapered shank portion 14 which is adapted to be inserted into a complimentary recess 16 within the spindle 12. In this regard, in the tool holder 10, the slope of the tapered inner surface 17 of the recess 16 corresponds to the slope of the tapered outer surface 15 of the shank portion 14, with the shank portion 14 being firmly seated with the recess 16 when the tool holder 10 is properly secured to the spindle 12. More particularly, in tool holder and spindle combinations known in the prior art, the typical tolerance along the length of the corresponding tapered surfaces of the shank portion of the tool holder and corresponding recess of the spindle is about +/− 0.040 inches. In accordance with the present invention, it is contemplated that the tapered outer surface 15 of the shank portion 14 will be sized and configured such that the typical tolerance along the length of the outer surface 15 of the shank portion 14 and corresponding tapered inner surface 17 of the recess 16 will be approximately +/− 0.015 inches. Typically, the tool holder 10 is secured to the spindle 12 by drawing the shank portion 14 upwardly into the recess 16, as will be discussed in more detail below.

In addition to the shank portion 14, the tool holder 10 comprises a cutting tool mounting portion 18. The mounting portion 18 itself defines a cylindrically configured upper section 20, and a cylindrically configured lower section 22. The lower section 22 extends axially from the upper section 20 and has an outer diameter which is less than that of the upper section 20 such that an annular shoulder 24 is defined between the upper and lower sections 20, 22. Extending axially within the lower section 22 of the mounting portion 18 is a central aperture 26 which is adapted to receive the shank portion 28 of a cutting tool 30. Though not shown, it will be recognized that the mounting portion 18 of the tool holder 10 may be of uniform diameter rather than including the differently sized upper and lower sections 20, 22 described above.

In addition to the shank and mounting portions 14, 18, the tool holder comprises a circularly configured flange portion 34 which is formed between the shank portion 14 and the upper section 20 of the mounting portion 18. The flange portion 34 extends radially outward relative to the shank portion 14 and the upper section 20, and includes a generally V-shaped slot 36 disposed within the peripheral edge thereof and extending circumferentially thereabout. The slot 36 is adapted to accommodate a tool holder changer (not shown) to carry and contact the tool holder 10 for automatic removal and insertion of the tool holder 10 from and into the spindle 12.

Those skilled in the art will recognize that that the tool holder 10 of the present invention bears general similarity to standard tool holder dimensional configurations such as the American Standard, Japanese B. T., European B. N., German DIN Standard, and Caterpillar V-Flange Standard.

Referring now to FIGS. 2 and 3, in addition to the slot 36, the flange portion 34 defines a generally planar top surface 38 which circumvents the base of the shank portion 14, and an opposed, generally planar bottom surface 40 which circumvents the base of the upper section 20 of the mounting portion 18. Disposed in the top surface 38 of the flange portion 34 is a continuous, annular groove or channel 42 which is of a prescribed width, depth and shape. As best seen in FIG. 4, the channel 42 has a generally quadrangular (e.g., rectangular) cross-sectional configuration defining a generally planar bottom wall or surface 44 and a spaced pair of concentric side walls or surfaces 46 which extend generally perpendicularly between the bottom surface 44 of the channel 42 and the top surface 38 of the flange portion 34.

The tool holder 10 of the present invention further comprises an annular, ring-like dampening member 48 which is disposed within the channel 42 of the flange portion 34. The dampening member 48 is preferably fabricated from a compressible material, such as an elastomeric material. The dampening member 48 is shown in a compressed state in FIGS. 2 and 3, and in an uncompressed state in FIGS. 4 and 5. As will be recognized by those of ordinary skill in the art, the dampening member 48 is in its uncompressed state (as shown in FIG. 4) prior to the interface of the tool holder 10 to the spindle 12. The dampening member 48 is preferably sized relative to the channel 42 such that when the dampening member 48 is in its uncompressed state, a small portion of the dampening member 48 protrudes upwardly beyond the top surface 38 of the flange portion 34, with a small gap or space being defined between the dampening member 48 and each of the side surfaces 46 defined by the channel 42.

As is best shown in FIGS. 2 and 3, the initial advancement of the shank portion 14 of the tool holder 10 into the recess 16 of the spindle 12 is limited by the abutment of the dampening member 48 against the annular, generally planar distal end surface 50 defined by the spindle 12. Fully securing the tool holder 10 to the spindle 12 by drawing the shank portion 14 upwardly into the recess 16 facilitates the compression of the dampening member 48 in a manner wherein the compressed dampening member 48 substantially fills or occupies the open area defined by the channel 42 when the same is enclosed by the distal end surface 50 of the spindle 12. In this regard, the movement of the shank portion 14 upwardly into the recess 16 is intended to be limited only by the direct, metal-to-metal contact between the distal end surface 50 of the spindle 12 and the top surface 38 of the flange portion 34. As indicated above, such abutting engagement facilitates the effective enclosure of the channel 42 by the distal end surface 50 of the spindle 12. Since the dampening member 48 is sized such that, when compressed, it substantially fills the available open area defined by the enclosed channel 42, the dampening member 48 is thus operative to impart a resilient biasing force against both the tool holder 10 and the spindle 12 seated there against. When the dampening member 48 is compressed in this manner, it is adapted to effectively dampen and thus substantially eliminate the harmonic resonance normally transferred into the tool holder 10 by the cutting tool 30. The dampening of such harmonic resonance prevents slight movements of the cutting tool 30 relative to the tool holder 10 which could cause cuts made by the cutting head of the cutting tool 30 to be substantially out of tolerance or, in extreme cases, could result in the loosening of the tool holder 10 within the spindle 12. Though direct, metal-to-metal contact between the distal end surface 50 of the spindle 12 and the top surface 38 of the flange portion 34 is preferred, the dampening functionality of the compressed dampening member 48 is realized even if such metal-to-metal contact is not achieved.

In addition to dampening harmonic resonance in the aforementioned manner, the dampening member 48, when compressed in the manner shown in FIGS. 2 and 3, creates a seal between the flange portion 34 and the distal end surface 50 of the spindle 12. The seal created by the dampening member 48 prevents debris, cutting oil, or other contaminants from getting between the outer surface 15 of the shank portion 14 and the inner surface 17 of the recess 16, thus maintaining the cleanliness of the combined tool holder 10 and spindle 12. The reduced contamination effectuated by the seal also leads to far less runout and dramatically improves cutting tolerances.

Figure 5:
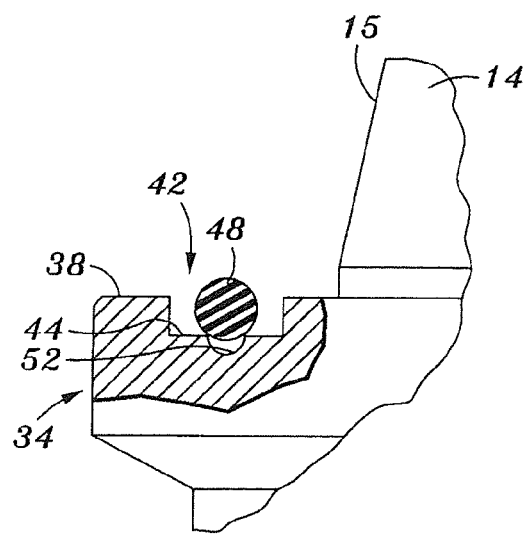
FIG. 5 is a partial cross-sectional view of the tool holder of the first embodiment similar to FIG. 4, but illustrating a first potential variant in the cross-sectional configuration of the channel thereof which is used to accommodate the dampening member.
Figure 5A:
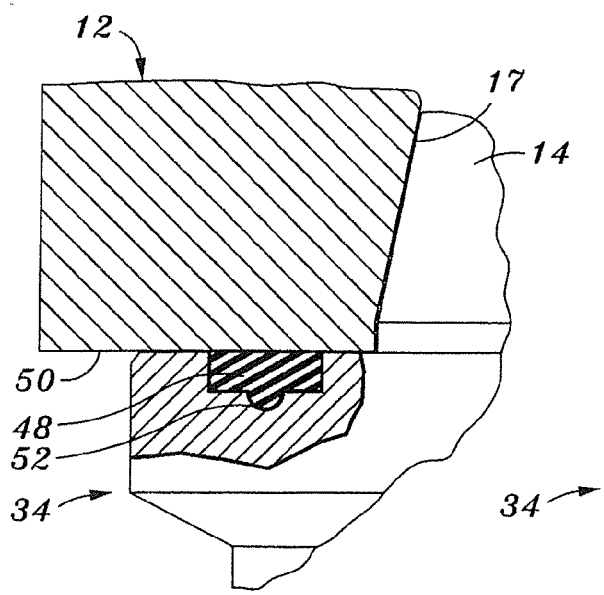
FIG. 5A is a partial cross-sectional view of the tool holder similar to FIG. 5, but depicting the dampening member in a compressed state while disposed within the first variant of the channel.

Referring now to FIGS. 5 and 5A, in accordance with a relatively minor variant of the tool holder 10 shown in FIGS. 1-4, it is contemplated that a continuous, annular groove 52 may optionally be formed in the bottom surface 44 of the channel 42. The groove 52 preferably has a generally semi-spherical cross-sectional configuration, and is formed in the bottom surface 44 of the channel 42 so as to be substantially equidistantly spaced concentrically between the side surfaces 46 defined by the channel 42. When the dampening member 48 is in its uncompressed state as shown in FIG. 5, the dampening member 48 typically extends along and thus covers or encloses the groove 52. When the dampening member 48 is in its compressed state as shown in FIG. 5A, the groove 52 is substantially filled thereby. Thus, the groove 52, if included in the channel 42, provides additional area for accommodating the compressed dampening member 48.

Figure 6:
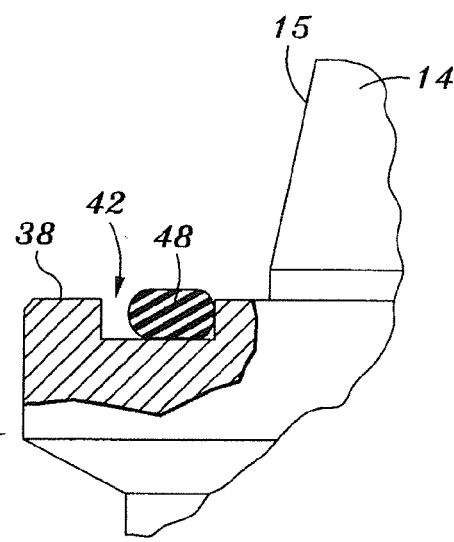
FIG. 6 is a partial cross-sectional view of the tool holder of the first embodiment similar to FIGS. 4 and 5, but illustrating a second potential variant in the cross-sectional configuration of the channel thereof which is used to accommodate the dampening member.

Referring now to FIG. 6, further in accordance with the present invention, it is contemplated that the dampening member 48 may be sized to have a diameter less than that of the channel 42 such that some degree of resilient expansion or enlargement of the dampening member 48 must occur to facilitate the insertion thereof into the channel 42. As is best seen in FIG. 6, such enlargement of the dampening member 48 results in the occurrence of a Poisson contraction therein which effectively reduces the height of the dampening member 48 to a level just protruding slightly beyond the top surface 38 of the flange portion 34. In addition to this height reduction of the dampening member 48, the same is maintained in biased engagement to the innermost side surface 46 defined by the channel 42, thus effectively maintaining the dampening member 48 within the channel 42. When the dampening member 48 is put into its compressed state by its abutment against the distal end surface 50 defined by the spindle 12, the dampening member 48 shown in its uncompressed state in FIG. 6 essentially assumes the same profile as that shown by the dampening member 48 in FIGS. 2 and 3.

In the tool holder 10 of the present invention, the shank portion 28 of the cutting tool 30 is preferably secured within the central aperture 26 of the lower section 22 of the mounting portion 18 via a heat shrinking process. In this respect, the aperture 26 is sized to have a diameter which is slightly less than the diameter of the shank portion 28. The application of heat to the lower section 22 via a heat source as an induction heater effectively increases the diameter of the aperture 26, thus allowing the shank portion 28 to be slideably inserted therein to a desired axial position. When the external application of heat via the induction heater is discontinued and the lower section 22 of the mounting portion 18 allowed to cool back to ambient temperature, thermal contraction causes the aperture 26 to form a rigid interference, i.e., a metal-to-metal fit, between the lower section 22 of the mounting portion 18 and the shank portion 28 of the cutting tool 30. As such, the heat shrinking process rigidly maintains the cutting tool 30 within the tool holder 10 in a concentric fashion for high tolerance machining applications. The use of the heat shrinking process prevents the non-concentric mounting of the cutting tool 30 within the tool holder 10 in view of the uniform engagement between the inner surface of the lower section 22 defining the aperture 26 and the outer surface of the shank portion 28 of the cutting tool 30.

The tool holder 10 of the present invention is preferably used by initially inserting the shank portion 14 into the recess 16 in the aforementioned manner such that the top surface 38 of the flange portion 34 is brought into direct contact with the distal end surface 50 of the spindle 12, such abutting contact resulting in the compression of the dampening member 48 as described above. Thereafter, the shank portion 28 of the cutting tool 30 is heat shrunk within the lower section 22 of the mounting portion 18 to facilitate the concentric attachment of the cutting tool 30 to the tool holder 10. Those of ordinary skill in the art will recognize that the cutting tool 30 may be attached to the tool holder 10 prior to the tool holder 10 being secured within the spindle 12.

Figures 7, 8:
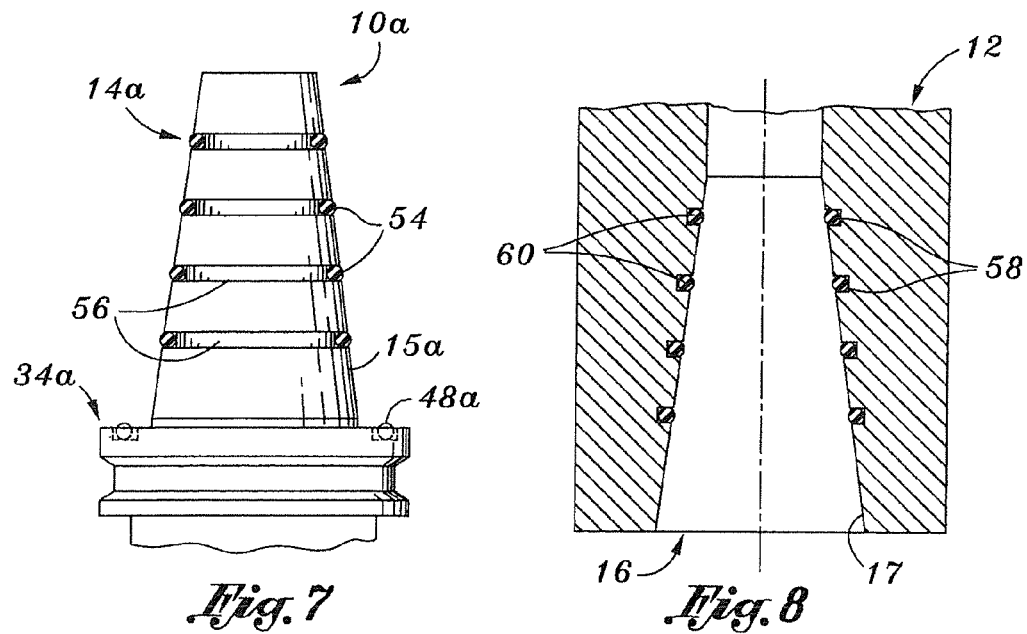
FIG. 7 is a partial cross-sectional view of a tool holder constructed in accordance with a second embodiment of the present invention and including one or more dampening members disposed within the conical shank portion thereof.
FIG. 8 is a partial, cross-sectional view of a machine tool spindle which may be outfitted with one or more internal dampening members in accordance with one aspect of the present invention.

Referring now to FIG. 7, there is shown a tool holder 10a constructed in accordance with a second embodiment of the present invention. The tool holder 10a is structurally identical to the above-described tool holder 10, with the distinction between the tool holders 10, 10a lying in the inclusion of additional dampening members 54 within the shank portion 14a of the tool holder 10a. More particularly, the tool holder 10a is preferably formed to include a plurality of continuous channels or grooves 56 which are formed in the tapered outer surface 15a of the shank portion 14a in spaced, generally parallel relation to each other and to the flange portion 34a. Disposed within each of the grooves 56 is a respective one of the dampening members 54. As will be recognized by those of ordinary skill in the art, due to the tapered configuration of the shank portion 14a, the circumference of the groove 56 disposed closest to the flange portion 34a exceeds the circumference of the groove 56 disposed furthest from the flange portion 34a. In this regard, the grooves 56 are of progressively decreasing circumference as they are disposed further from the flange portion 34a. Importantly, each of the grooves 56 is formed to have a depth such that when a corresponding one of the dampening members 54 is completely inserted therein, only a small portion of such dampening member 54 protrudes from the outer surface 15a of the shank portion 14a.

When the shank portion 14a is advanced into the recess 16 of the spindle 12, the dampening members 54 are adapted to supplement the vibration or harmonic resonance dampening effect of the dampening member 48a of the tool holder 10a. In this regard, due to the close tolerances between the outer surface 15a of the shank portion 14a and the inner surface 17 defined by the recess 16 of the spindle 12 as described above, the complete advancement of the shank portion 14a into the recess 16 (i.e. the abutment of the top surface 38a of the flange portion 34a against the distal end surface 50) results in the compression of the dampening members 54 in a manner resulting in the direct, metal-to-metal contact between the outer surface 15a of the shank portion 14a and the inner surface 17 of the recess 16. In this regard, the dampening members 54 and the grooves 56 are sized relative to each other such that the compression of each dampening member 54 causes it to substantially fills the available open area defined by the corresponding enclosed groove 56, the compressed dampening members 54 thus being operative to impart a resilient biasing force against both the tool holder 10a and the spindle 12 seated there against. When the dampening members 54 are compressed in this manner, they are adapted to supplement the effect of the compressed dampening member 48a and to effectively dampen and thus substantially eliminate the harmonic resonance normally transferred into the tool holder 10a by the cutting tool 30. Though the shank portion 14a of the tool holder 10a is shown as including four dampening members 54 in FIG. 7, those of ordinary skill in the art will recognize that fewer or greater than four dampening members 54 may be included in the shank portion 14a without departing from the spirit and scope of the present invention. Additionally, though not shown, it is contemplated that the groove(s) 56 and corresponding dampening member(s) 54 may alternatively be configured to extend generally linearly between the distal end of the shank portion 14a and the top surface 38a of the flange portion 34a in any one of a wide variety of numbers and spatial separations. Further, though being intended to supplement the effect of the dampening member 48a, those of ordinary skill in the art will recognize that the dampening member(s) 54 may be used independently of the dampening member 48a, i.e., the dampening member 48a need not necessarily be included in the tool holder 10a.

Referring now to FIG. 8, in accordance with another aspect of the present invention, it is contemplated that the tapered inner surface 17 partially defining the recess 16 of the spindle 12 may include a plurality of grooves 58 therein which accommodate dampening members 60. More particularly, the spindle 12 is preferably formed to include a plurality of the continuous grooves 58 which are formed in the tapered inner surface 17 of the spindle 12 in spaced, generally parallel relation to each other. Disposed within each of the grooves 58 is a respective one of the dampening members 60. As will be recognized by those of ordinary skill in the art, due to the tapered configuration of the inner surface 17, the circumference of the groove 58 disposed closest to the distal end surface 50 exceeds the circumference of the groove 58 disposed furthest from the distal end surface 50. In this regard, the grooves 58 are of progressively decreasing circumference as they are disposed further from the distal end surface 50. Importantly, each of the grooves 58 is formed to have a depth such that when a corresponding one of the dampening members 60 is completely inserted therein, only a small portion of such dampening member 60 protrudes from the inner surface 17 of the spindle 12.

When the shank portion 14 of the tool holder 10 described above is advanced into the recess 16 of the spindle 12, the dampening members 60 are adapted to supplement the vibration or harmonic resonance dampening effect of the dampening member 48 of the tool holder 10. In this regard, due to the close tolerances between the outer surface 15 of the shank portion 14 and the inner surface 17 defined by the recess 16 of the spindle 12 as described above, the complete advancement of the shank portion 14 into the recess 16 (i.e. the abutment of the top surface 38 of the flange portion 34 against the distal end surface 50) results in the compression of the dampening members 60 in a manner resulting in the direct, metal-to-metal contact between the outer surface 15 of the shank portion 14 and the inner surface 17 of the recess 16. In this regard, the dampening members 60 and the grooves 58 are sized relative to each other such that the compression of each dampening member 60 causes it to substantially fills the available open area defined by the corresponding enclosed groove 58, the compressed dampening members 60 thus being operative to impart a resilient biasing force against both the tool holder 10 and the spindle 12. When the dampening members 60 are compressed in this manner, they are adapted to supplement the effect of the compressed dampening member 48 of the tool holder 10 and to effectively dampen and thus substantially eliminate the harmonic resonance normally transferred into the tool holder 10 by the cutting tool 30. Though the inner surface 17 of the spindle 12 is shown as including four dampening members 60 in FIG. 8, those of ordinary skill in the art will recognize that fewer or greater than four dampening members 60 may be included in the inner surface 17 without departing from the spirit and scope of the present invention. Additionally, though not shown, it is contemplated that the groove(s) 58 and corresponding dampening member(s) 60 may alternatively be configured to extend generally linearly between the innermost end of the recess 16 and the distal end surface 50 of the spindle 12 in any one of a wide variety of numbers and spatial separations. Further, though being intended to supplement the effect of the dampening member 48 of the tool holder 10, those of ordinary skill in the art will recognize that the dampening member(s) 60 may be used independently of the dampening member 48, i.e., the dampening member 48 need not necessarily be included in the tool holder 10.

Figure 9:
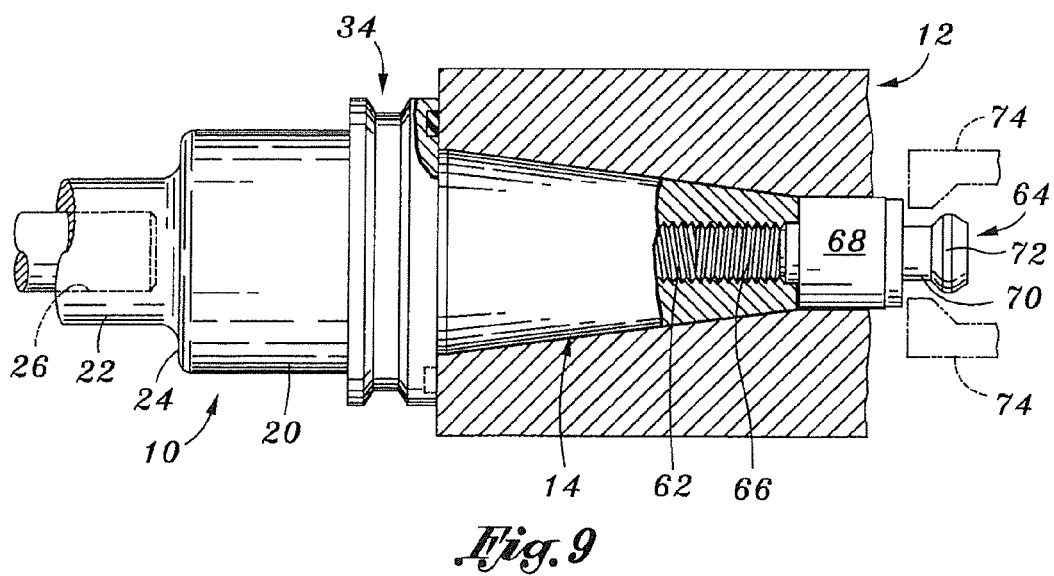
FIG. 9 is a partial cross-sectional view of the tool holder and spindle combination similar to FIG. 2, but further illustrating an optional retention knob member which may be cooperatively engaged to the shank portion of the tool holder constructed in accordance with either the first or second embodiments of the present invention.

Referring now to FIG. 9, in accordance with yet another aspect of the present invention, in the tool holder 10 described above, the shank portion 14 is provided with an internally threaded aperture 62 which extends axially through at least a portion thereof. More particularly, the aperture 62 extends axially from the distal end of the shank portion 14 disposed furthest from the flange portion 34, and may extend all the way to the flange portion 34 into communication with the aperture 26 which extends through the mounting portion 18 as described above. Additionally, the aperture 62 may be provided with a right-handed internal threads suitable for threadably accommodating the above-described externally threaded bolt which is advanced through a portion of the spindle 12 and is threadably received into the aperture 62, the tightening of such bolt by the rotation thereof in a clockwise direction being used to effectively draw the shank portion 14 upwardly into the recess 16 of the spindle 12 until such time as the flange portion 34 is seated against the distal end surface 50.

In the tool holder 10, it is contemplated that the aperture 62 may be internally threaded with a left-handed thread as opposed to the more conventional right-handed thread. Such left-handed thread of the aperture 62 would be used to accommodate a corresponding left-handed thread included on any corresponding retention member used in conjunction with the tool holder 10. Once such retention member is an extension member 64 which may threaded into the aperture 62 in the manner shown in FIG. 9, such threadable engagement being facilitated by the rotation of the extension member 64 in a counter-clockwise direction. More particularly, the extension member 64 comprises an externally threaded end portion 66 which is received into the aperture 62, the end portion 66 transitioning into an enlarged diameter central portion 68. The central portion 68 of the extension member 64 itself transitions into a retention knob portion 70. The retention knob portion 70 is formed to have a bulbous configuration having a generally frusto-conical shaped flange 72 which is adapted to engaged a pair of draw bar ears or retention members 74 (depicted in phantom lines in FIG. 9) of a conventional tool changer retention device disposed within the interior of the spindle 12.

As is apparent from FIG. 9, the adaptation of the tool holder 10 for use with an automatic tool changer system is accomplished by simply threading the end portion 66 of the extension member 64 into the complimentary internally threaded aperture 62 extending within the shank portion 14 of the tool holder 10 until such time as an annular shoulder 76 defined by the central portion 68 abuts the distal end of the shank portion 14. The tool holder 10 with the cutting tool 30 mounted within the aperture 26 may then be automatically inserted into the spindle 12 by the automatic tool changer mechanism which holds the tool holder 10 by interaction with the V-shaped slot 36 formed within the flange portion 34. The tool changer then advances the shank portion 14 into the recess 16, with the tool holder retention members 74 then being automatically operative to move radially inward toward the retention knob portion 70 and, upon contacting the same, to subsequently move axially away from the flange portion 34 to draw the tool holder 10 inwardly into the recess 16 of the spindle 12 until such time as the flange portion 34 is abutted against the distal end surface 50.

Advantageously, due to the threadable engagement of the extension member 64 to the tool holder 10 through the use of corresponding, complimentary left-handed threads, the subsequent rotation of the tool holder 10 and spindle 12 in a clockwise direction as normally occurs during the performance of a cutting operation through the use of the cutting tool 30 does not result in any loosening of the extension member 64 within the shank portion 14, as could result in a loss of concentricity and the generation of harmonic resonance. Rather, the corresponding left handed threads actually tighten the contact between the extension member 64 and the shank portion 14, which assists in preventing the formation of a separation gap between the flange portion 34 and the distal end surface 50.

Additionally, it is contemplated that the engagement between the extension member 64 and shank portion 14 of the tool holder 10 may be further strengthened through the use of a heat shrinking process. In this respect, the application of heat to the shank portion 14 may be conducted in a manner wherein the aperture 62 is enlarged to a dimension sufficient to allow for the threadable advancement of the end portion 66 of the extension member 64 thereinto. Upon the abutment of the shoulder 76 against the distal end of the shank portion 14, the subsequent cooling of the shank portion 14 constricts the same about the end portion 66, thus firmly engaging the extension member 64 to the tool holder 10.

Still further in accordance with the present invention, it is contemplated that the vibration/harmonic resonance dampening effects of the tool holders 10, 10a may be enhanced by at least partially fabricating the same from a heavy metal material (e.g., mercury, tungsten, lead) or a combination of heavy metal materials. However, if such heavy metal material(s) is/are used in relation to the fabrication of the tool holders 10, 10a, it is further contemplated that the maximum temperature to which the tool holders 10, 10a may be heated through the use of an induction heater to facilitate the mounting of the cutting tool 30 and/or the extension member 64 thereto will be maintained below a prescribed limit to avoid triggering any adverse reactions from such heavy metal material(s).

Figure 10:
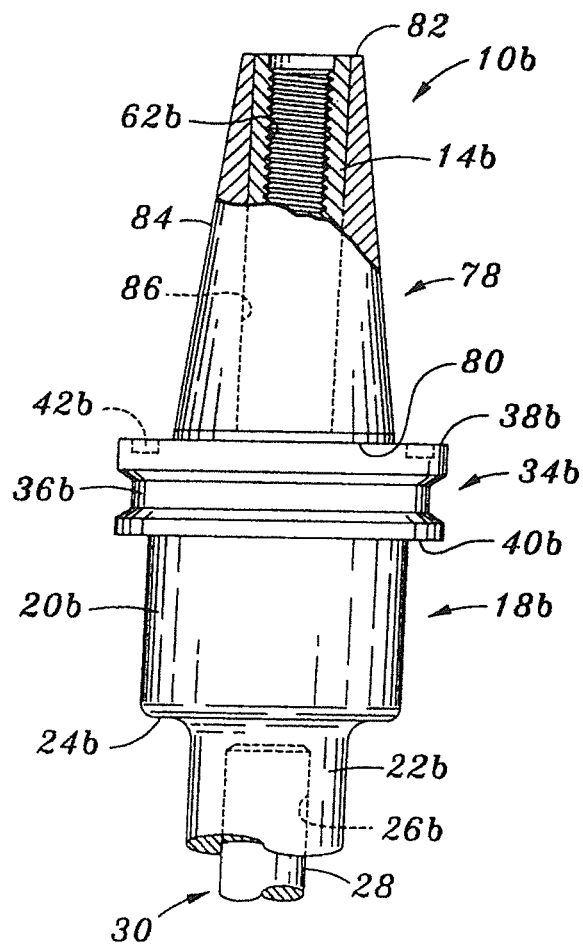
FIG. 10 is a partial cross-sectional view of a tool holder constructed in accordance with a third embodiment of the present invention and including a shrink on sleeve which defines the tapered outer surface of the shank portion of the tool holder.

Referring now to FIG. 10, there is shown a tool holder 10b which is constructed in accordance with a third embodiment of the present invention and is also adapted for use in the rotating spindle 12. The tool holder 10b comprises a cutting tool mounting portion 18b. The mounting portion 18b itself defines a cylindrically configured upper section 20b, and a cylindrically configured lower section 22b. The lower section 22b extends axially from the upper section 20b, and has an outer diameter which is less than that of the upper section 20b such that an annular shoulder 24b is defined between the upper and lower sections 20b, 22b. Extending axially within the lower section 22b is a central aperture 26b which is adapted to receive the shank portion 28 of the cutting tool 30. It will be recognized that the mounting portion 18b may be of uniform diameter rather than including the differently sized upper and lower sections 20b, 22b described above and shown in FIG. 10.

The tool holder 10b further comprises a circularly configured flange portion 34b which is formed at the end of the upper section 20b of the mounting portion 18b opposite that having the lower section 22b protruding therefrom. The flange portion 34b extends radially outward relative to the upper section 20b, and includes a generally V-shaped slot 36b disposed within the peripheral edge thereof and extending circumferentially thereabout. In addition to the slot 36b, the flange portion 34b defines a generally planar top surface 38b and an opposed, generally planar bottom surface 40b which circumvents the base of the upper section 20b. Disposed on the top surface 38b is a continuous, annular groove or channel 42b which is of a prescribed width and depth. The structural attributes of the channel 42b are the same as those described above in relation to the channel 42 of the tool holder 10. In this regard, in the tool holder 10b, the channel 42b is used to accommodate a dampening member (not shown in FIG. 10) like the dampening member 48 also shown and described above in relation to the tool holder 10.

The tool holder 10b of the third embodiment further comprises a generally cylindrical shank portion 14b which protrudes axially from the top surface 38b of the flange portion 34b. The shank portion 40b is provided with an internally threaded aperture 62b which extends axially through at least a portion thereof. More particularly, the aperture 62b extends axially from the distal end of the shank portion 14b disposed furthest from the flange portion 34b, and may extend all the way to the flange portion 34b into communication with the aperture 26b which extends through the mounting portion 18b as described above.

Also included in the tool holder 10b is a generally conical sleeve 78 which is rigidly attached to the shank portion 14b via a heat shrink fit process, as will be described in more detail below. The sleeve 78 defines an annular bottom end 80 which is of a first diameter, and an annular top end 82 which is of a second diameter less than the first diameter. The sleeve 78 further defines a tapered outer surface 84 which extends between the bottom and top ends 80, 82 thereof. Additionally, extending axially through the sleeve 78 between the bottom and top ends 80, 82 thereof is a bore 86 of substantially constant diameter. The bore 86 is sized to have an inner diameter which is slightly less than the outer diameter of the shank portion 14b. The application of heat to the sleeve 78 via a heat source such as an induction heater effectively increases the diameter of the bore 86, thus allowing the sleeve 78 to be slideably advanced over the shank portion 14b. The advancement of the sleeve 78 along the shank portion 14b is limited by the abutment of the bottom end 80 of the sleeve 78 against the top surface 38b of the flange portion 34b. The shank portion 14b and sleeves 78 are sized relative to each other such that when the bottom end 80 is abutted against the top surface 38b of the flange portion 34b, the distal end of the shank portion 14b is substantially flush or continuous with the top end 82 of the sleeve 78, in the manner shown in FIG. 10. When the external application of heat via the induction heater is discontinued and the sleeve 78 allowed to cool back to ambient temperature, thermal contraction facilitates the formation of a rigid interface (i.e., a metal-to-metal fit) between the sleeve 78 and the shank portion 14b. As will be recognized by those of ordinary skill in the art, the combination of the shank portion 14b and sleeve 78 in the tool holder 10b collectively defines a structure possessing substantially the same structural and functional attributes of the shank portion 14 of the above-described tool holder 10. In this regard, the slope of the tapered outer surface 84 of the sleeve 78 corresponds to the slope of the tapered inner surface 17 of the recess 16 within the spindle 12, with the sleeve 78 being firmly seated within the recess 16 when the tool holder 10b is properly secured to the spindle 12. Though not shown in FIG. 10, it is contemplated that all or at least a portion of the outer surface 84 of the sleeve 78 may include a coating of vulcanized rubber applied thereto to provide extra gripping power when the sleeve 78 is advanced into the recess 16 of the spindle 12. Such gripping power may be enhanced by the optional inclusion of a grit mixed in with the vulcanized rubber. It is further contemplated that the outer surface 15 of the shank portion 14 of the tool holder 10 described above may include such vulcanized rubber coating on all or at least a portion thereof.

Though not shown, the spindle 12 may be outfitted to include a pair of tabs which are attached to the distal end surface 50 so as to be separated from each other by a prescribed distance. These tabs are typically secured to the spindle 12 via respective bolts which are advanced through complimentary openings extending through the tabs and into respective ones of a complimentary pair of internally threaded apertures disposed within the distal end surface 50 of the spindle 12. These tabs are adapted to be used in conjunction with tool holders which include a corresponding pair of notches or recesses within the radially extending flange portion thereof. These recesses are separated from each other at an interval of approximately 180°, and receive respective ones of the tabs once the shank portion of such tool holder is fully inserted into the recess 16 of the spindle 12. The receipt of the tabs into the respective ones of the recesses is use to prevent any slippage of the tool holder relative to the spindle 12. As will be recognized, if the tool holder does not include such recesses in the flange portion thereof, the tabs protruding from the distal end surface 50 would not be needed, and thus would be removed since they would otherwise interfere with the continuous flange portion. The tool holders 10, 10a, 10b described above and constructed in accordance with the present invention include continuous flange portions 34, 34a, 34b which are devoid of the aforementioned recesses.

Figure 11:
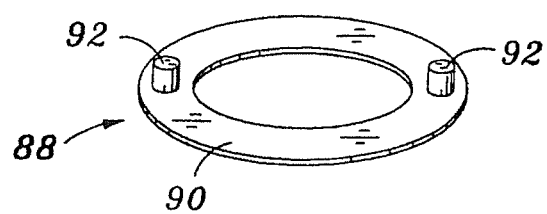
FIG. 11 is a top perspective view of an adapter ring constructed in accordance with another aspect of the present invention for optional use in interfacing the tool holder of the first, second or third embodiments to the spindle.

Upon the removal of the tabs from the distal end surface 50 of the spindle 12, the internally threaded openings remain in the distal end surface 50. In order to effectively plug these openings when the spindle 12 is to be used in conjunction with any of the tool holders 10, 10a, 10b which do not include the recesses as indicated above, such tool holders 10, 10a, 10b may each be optionally outfitted with the adapter ring 88 shown in FIG. 11. The adapter ring 88 includes an annular main body 90 having a pair of cylindrical projections 92 protruding from a common side or surface thereof. The distance separating the projections 92 from each other is adapted to mirror the distance separating the apertures disposed in the distal end surface 50 of the spindle 12 which are exposed as a result of removal of the tabs therefrom. The adapter ring 88 is used by advancing the same over the shank portion 14, 14a or sleeve 78 until such time as the side of the main body 90 opposite that having the projections 92 extending therefrom is abutted against the dampening member 48, 48a. The subsequent complete advancement of the shank portion 14, 14a or sleeve 78 into the recess 16 results in the insertion of the projections 92 into respective ones of the apertures within the distal end surface 50, and the abutment of the side of the main body 90 having the projections 92 extending therefrom against the distal end surface 50. The compression of the dampening member 48, 48a also results in the side of the main body 90 opposite that having the projections 92 protruding therefrom potentially coming into direct, metal-to-metal contact with the top surface 38, 38a, 38b of the flange portion 34, 34a, 34b.

Though not shown, those of ordinary skill in the art will recognize that the adapter ring 88 need not necessarily be provided with the projections 92. In this regard, though the projections 92 effectively fill portions of the apertures which may be included in the distal end surface 50, a variant of the adapter ring 88 not including the projections 92 would still be operative to effectively cover the open apertures within the distal end surface 50 of the spindle 12.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A method for securing a tool holder to a spindle, the method comprising the steps of: providing a threaded aperture within a shank portion of the tool holder; heating the shank portion of the tool holder to enlarge the threaded aperture; threading a threaded end portion of an extension member into the heated shank portion; and cooling the shank portion.

2. The method of claim 1 further comprising the steps of: inserting the shank portion of the tool holder into a recess of the spindle from a first side of the spindle; and pulling the extension member from an opposed second side of the spindle to complete insertion of the shank portion of the tool holder into the recess of the spindle.

3. The method of claim 1, wherein the shank portion of the tool holder comprises a heavy metal.

4. The method of claim 3, wherein the heavy metal is selected from the group consisting of mercury, tungsten, lead and a combination thereof.

5. The method of claim 1, wherein the extension member of the tool holder comprises a heavy metal.

6. The method of claim 5, wherein the heavy metal is selected from the group consisting of mercury, tungsten, lead and a combination thereof.

7. The method of claim 1, wherein the threaded aperture comprises a non-threaded entry portion, the non-threaded entry portion having an inner diameter; and wherein the threaded end portion comprises a non-threaded neck portion, the non-threaded neck portion having an outer diameter complimentary with the inner diameter of the non-threaded entry portion.

8. A method for securing a tool holder to a spindle, the method comprising the steps of: providing an aperture within a shank portion of the tool holder; providing a dampening member within a groove in the tool holder; heating the shank portion of the tool holder to enlarge the aperture; inserting an end portion of an extension member into the heated shank portion; and cooling the shank portion.

9. The method of claim 8 further comprising the steps of: inserting the shank portion of the tool holder into a recess of the spindle from a first side of the spindle; and pulling the extension member from an opposed second side of the spindle to complete insertion of the shank portion of the tool holder into the recess of the spindle.

10. The method of claim 8, wherein the shank portion of the tool holder comprises a heavy metal.

11. The method of claim 10, wherein the heavy metal is selected from the group consisting of mercury, tungsten, lead and a combination thereof.

12. The method of claim 8, wherein the extension member of the tool holder comprises a heavy metal.

13. The method of claim 12, wherein the heavy metal is selected from the group consisting of mercury, tungsten, lead and a combination thereof.

14. The method of claim 8, wherein the aperture comprises an entry portion, the entry portion having an inner diameter; and wherein the end portion comprises a neck portion, the neck portion having an outer diameter complimentary with the inner diameter of the entry portion.

\* \* \* \* \*